United States Patent [19]
Diebolt

[11] Patent Number: 5,394,761
[45] Date of Patent: Mar. 7, 1995

[54] LINKAGE ACTUATOR FOR EFFECTING ALL RECTILINEAR OR ROTATIVE MOVEMENTS

[76] Inventor: Rémy Diebolt, 20, rue du 22 Novembre, 67440 Marmoutier, France

[21] Appl. No.: 804,713

[22] Filed: Dec. 12, 1991

[30] Foreign Application Priority Data

Dec. 20, 1990 [FR] France .................. 90 16393

[51] Int. Cl.⁶ .............................................. F16H 21/44
[52] U.S. Cl. ...................... 74/89.21; 74/89.22; 74/108; 92/137
[58] Field of Search ............... 74/89.2, 89.21, 89.22, 74/37, 108; 901/22; 92/137

[56] References Cited

U.S. PATENT DOCUMENTS

| 286,900 | 10/1883 | Burke | 74/37 |
|---|---|---|---|
| 4,003,484 | 1/1977 | Jones et al. | 74/89.2 X |
| 4,078,680 | 3/1978 | Pilch | 74/89.2 X |
| 4,235,421 | 11/1980 | Phillips | 254/386 |
| 4,301,688 | 11/1981 | Salvati | 74/37 |
| 4,312,432 | 1/1982 | Sugawa | 74/89.22 X |
| 4,453,072 | 6/1984 | Middleton, Jr. et al. | 74/89.22 X |
| 4,503,722 | 3/1985 | Suzuki et al. | 74/89.21 X |
| 4,537,084 | 8/1985 | Passemard et al. | 74/89.2 X |
| 4,645,408 | 2/1987 | Mizuno | 901/22 X |
| 4,704,046 | 11/1987 | Yant | 74/89.21 X |
| 5,035,171 | 7/1991 | Gottling et al. | 74/89.22 X |

FOREIGN PATENT DOCUMENTS

| 1220747 | 7/1966 | Germany . | |
|---|---|---|---|
| 269652 | 7/1989 | Germany | 74/37 |
| 973290 | 10/1964 | United Kingdom | 74/89.22 |

Primary Examiner—Allan D. Herrmann
Attorney, Agent, or Firm—Young & Thompson

[57] ABSTRACT

The present invention relates to a linkage actuator for effecting all rectilinear or rotative movements, acting on the elements (1 and 2) constituting the linkage, characterized in that it acts directly on the linkage axle (3) and in that it is preferably constituted by at least one jack (4) and by chains or cables (5) guided on the one hand on the linkage axle (3) and on the other hand on the pinions or pulleys or grooved wheels (6), the jack (4) coacting with the chains or cables (5) and if desired with the linkage axle (3), which is integral at its ends with one of the elements (1 or 2), the other element (2 or 1) housing the actuator.

4 Claims, 4 Drawing Sheets

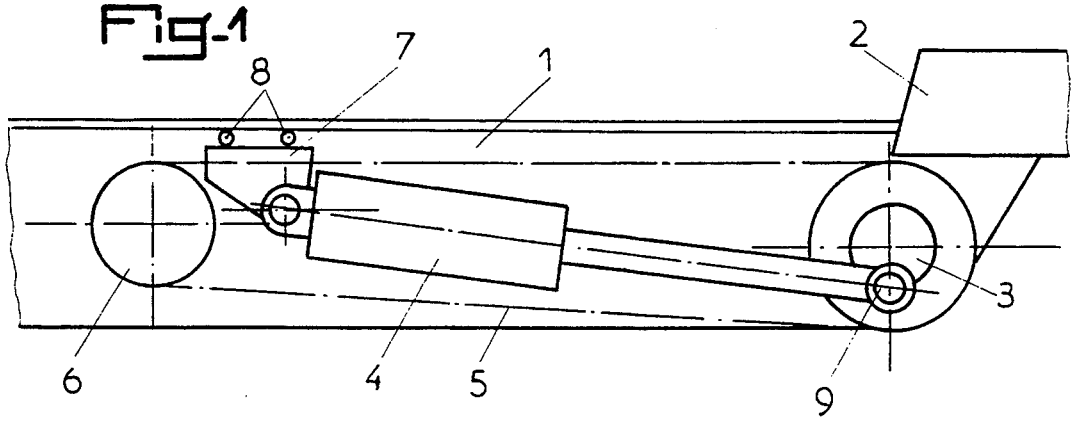
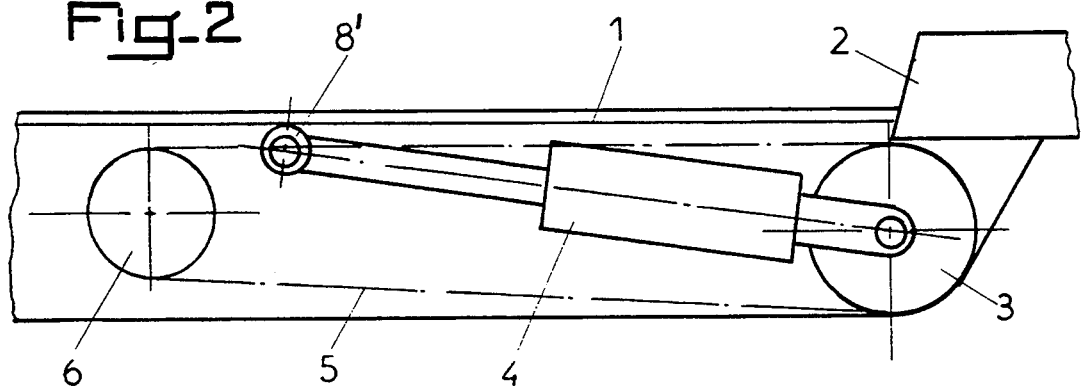
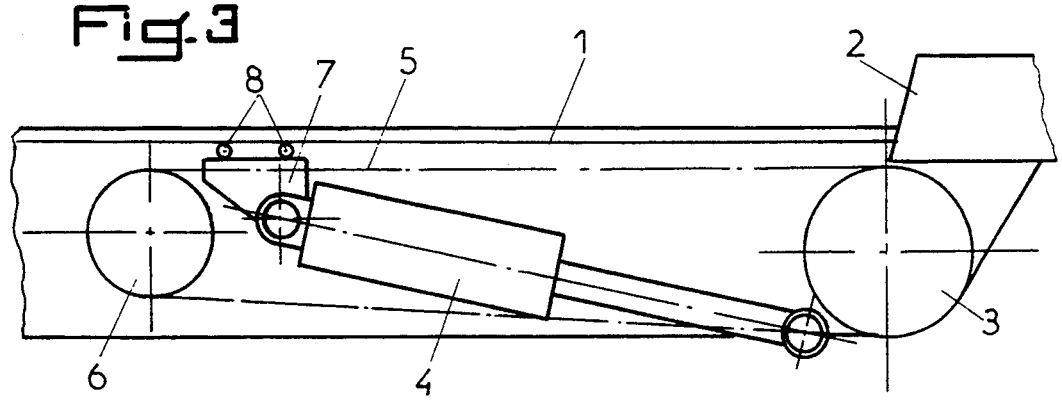

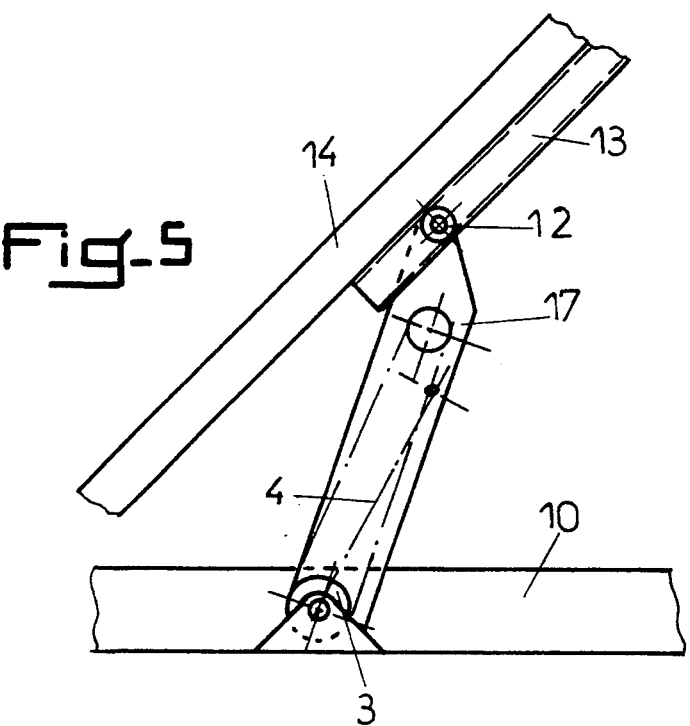
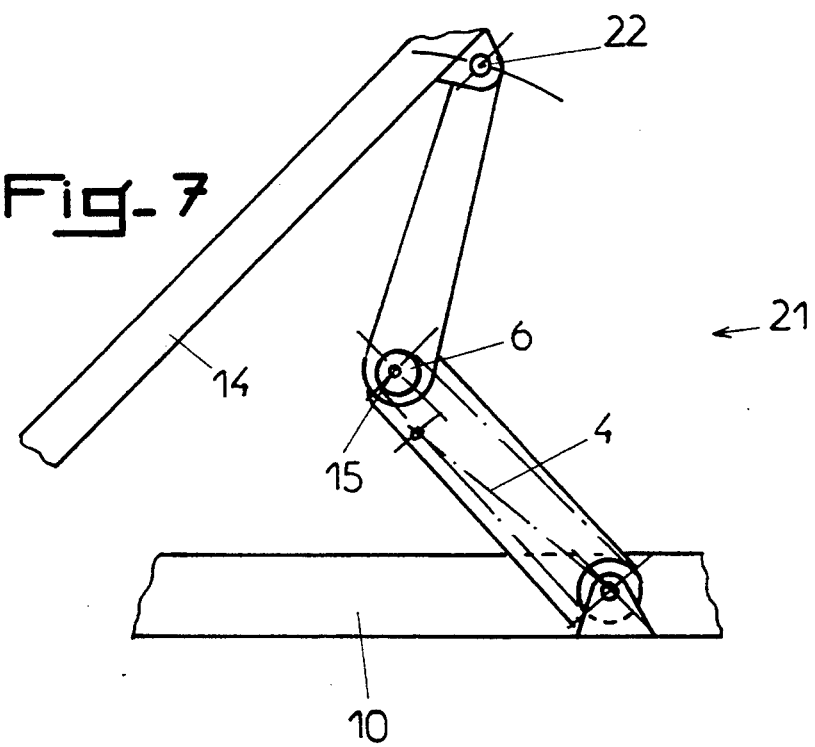

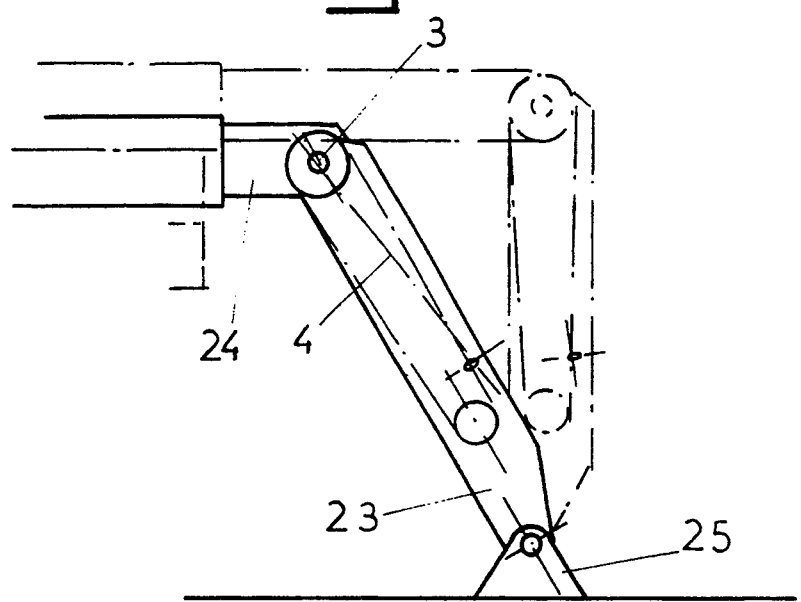
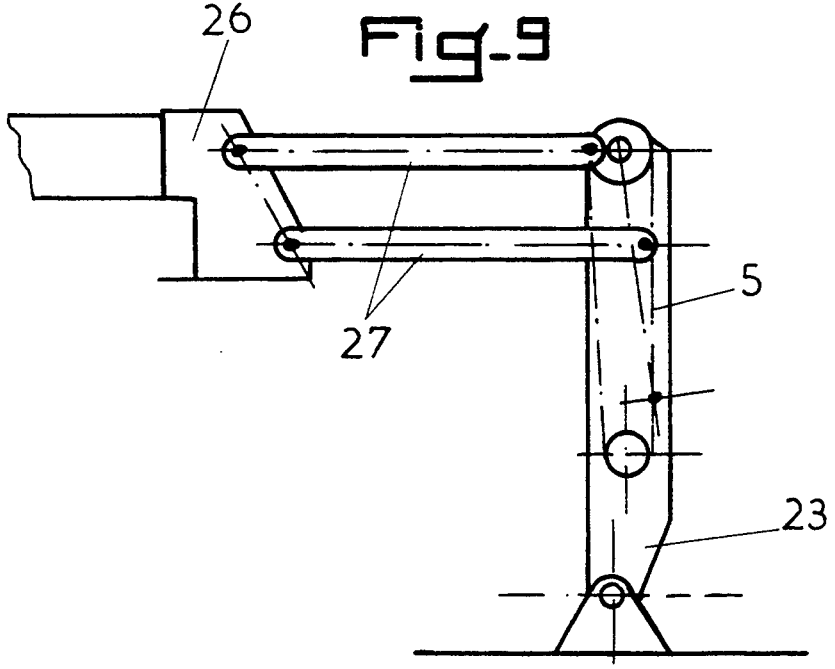

LINKAGE ACTUATOR FOR EFFECTING ALL RECTILINEAR OR ROTATIVE MOVEMENTS

FIELD OF THE INVENTION

The present invention relates to the field of handling equipment in general, namely to raise, turn, push and pull, as well as for the stabilization of handling machines or of road vehicles or the like, or other applications, and has for its object a linkage actuator for effecting all rectilinear or rotative movements.

BACKGROUND OF THE INVENTION

At present, the linkage of handling equipment, of road vehicles or the like, namely the linkage between the various foldable elements of a crane boom, the linkage of the outriggers of certain road vehicles and/or their trailers or semi-trailers or the like, or also the linkage of a swinging yoke for a bucket or the like, or all other mechanisms requiring rotative or rectilinear movement, are generally effected by means of jacks disposed between the elements constituting the linkage, by mounting under or on said elements.

Such an embodiment imposes very great force on said elements and requires a large size of the assembly thus provided.

It has been proposed to overcome this drawback by placing the jack partially within at least one element of the linkage, which however gives rise to the need to reinforce the side walls of the casing forming said element.

Moreover, such an arrangement of a jack on the upper or lower surface of at least one of the linkage elements also has the drawback of exposing said jack to the risk of rapid deterioration, by shock or by pressure on or against foreign bodies, requiring its frequent replacement and therefore high maintenance costs.

Finally, the jacks utilized in these types of linkages generally require, even though disposed within the linkage, a very large size.

SUMMARY OF THE INVENTION

The present invention has for its object to overcome these drawbacks.

It thus has for its object a linkage actuator for effecting all rectilinear or rotative movements, acting on constituent elements of the linkage, characterized in that it acts directly on the linkage axle and in that it is preferably constituted by at least one jack and by chains or cables guided on the one hand on the linkage axle and on the other hand on pinions or pulleys or grooved wheels, the jack coacting with the chains or cables and if desired with the linkage axle.

BRIEF DESCRIPTION OF THE DRAWINGS

The invention will be better understood from the following description which relates to preferred embodiments, given by way of non-limiting examples, and explained with reference to the accompanying schematic drawings, in which:

FIG. 1 is a fragmentary side elevational view in cross section of a linkage actuator according to the invention;

FIGS. 2 and 3 are views analogous to that of FIG. 1 showing modified embodiments of the invention;

FIGS. 5 to 7 are views analogous to that of FIG. 4, showing modified embodiments of the actuation of a truck bed, and FIGS. 8 and 9 are fragmentary side elevational views showing the actuation of an outrigger.

DETAILED DESCRIPTION OF THE INVENTION

Figure 4:
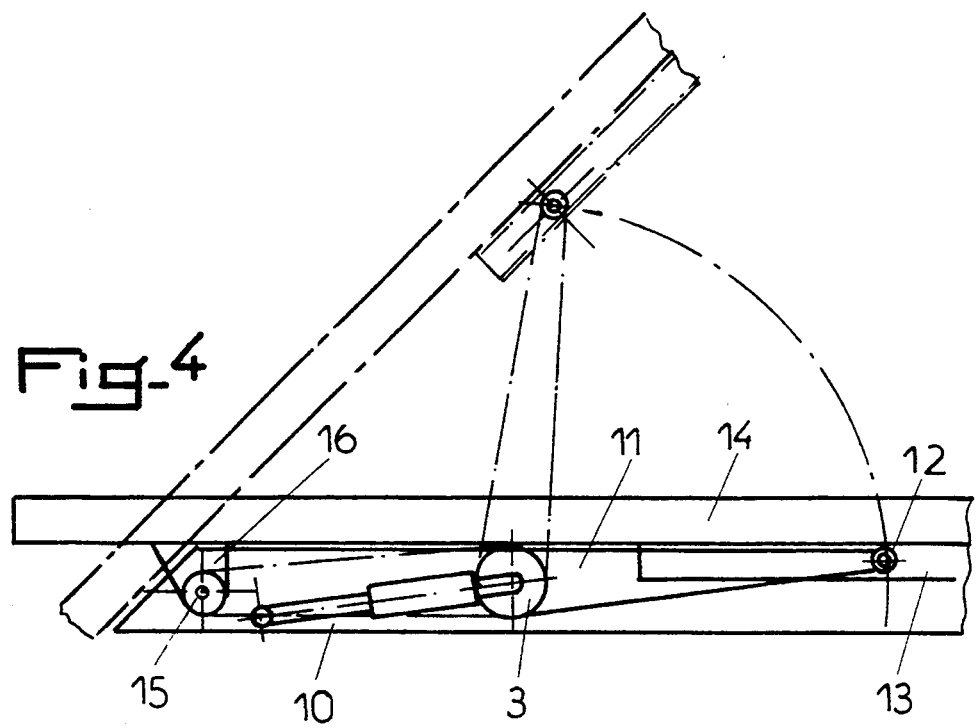
FIG. 4 is a fragmentary side elevational view showing the application of an actuator to a swinging truck bed.

According to the invention, and as shown more particularly by way of non-limiting examples in FIGS. 1 to 3 of the accompanying drawings, the linkage actuator for effecting all rectilinear or rotative movements, acting on elements 1 and 2 constituting the linkage, is characterized in that it acts directly on the linkage axle 3 and in that it is preferably constituted by at least one jack 4 and by chains or cables 5, guided on the one hand on the linkage axle 3 and on the other hand on pinions or pulleys or grooved wheels 6, the jack 4 coacting with chains or cables and if desired with the linkage axle 3, which is secured at its ends to one of the elements 1 or 2, the other element 2 or 1 housing the actuator.

According to a first embodiment of the invention, shown in FIG. 1 of the accompanying drawings, the jack 4 is connected by its cylinder by means of a carriage 7 to the chains or cables 5, said carriage 7 comprising guide rollers 8 for guidance on the corresponding internal surface of one of the elements 1 or 2, these rollers 8 being either above the carriage 7, or mounted on connecting axles of said carriage 7 with the chain links or with the cables 5, the end of the piston rod of the jack 4 acting on an eccentric sleeve 9 on the linkage axle 3. This embodiment permits obtaining a high rotative force, with use of a jack of relatively reduced diameter compared to what would be necessary for a jack to actuate the known linkages, because of the provision of a lever arm on the axle 3 and of a traction exerted on the chains or cables 5 also on this axle 3.

FIG. 2 shows another embodiment of the invention, in which the jack 4 is mounted by its cylinder on the linkage axle 3 between the elements 1 and 2 and is connected by the end of its piston rod directly to the chains or cables 5, the rollers 81 being provided at this connection and coacting with the corresponding internal wall of the element 1 or 2.

According to another modified form of the invention, shown in FIG. 3 of the accompanying drawings, the jack 4 acts directly, with its two ends, on the runs of the chains or cables 5 with guidance of these linkage elements with the chains or cables 5 by means of rollers, on the corresponding internal walls of the element 1 or 2. Thus, the lever arm is multiplied by two, whereby it is possible to obtain maximum torque on the axle 3.

The embodiments of a linkage actuator according to FIGS. 1 to 3 are particularly adapted for unfolding one or several articulated arms of a crane, of a handling mast, of an articulated arm for supporting a scoop, of a cableway mast, or the like.

Of course, in such a case, it suffices simply to provide as many linkage actuators as there are linkage axles.

According to another modified form of the invention, not shown in the accompanying drawings, the linkage actuator could preferably be mounted in a slider forming a frame to be inserted and to be blocked in the end of one of the elements 1 or 2, the linkage axle 3 forming an integral part of this slider, the other element 2 or 1 being mounted by means of lateral plates on the ends of the axle 3 after insertion of said slider in the first element 1 or 2.

Such an embodiment permits limiting the machining of the element for reception of the actuator to a minimum and to provide a mounting and a preadjustment of the assembly of the actuator before insertion into said element.

FIGS. 4 to 9 to of the accompanying drawings show various possible uses of the actuator according to the invention. Thus, FIGS. 4 to 7 relate to adaptations for trucks or trailers provided with swinging beds or removable beds.

In the embodiment of FIG. 4, one of the linkage elements is constituted directly by the chassis 10 of a truck or a trailer and houses the actuator, the other linkage element being constituted by an arm 11 fixed at one end to the axle 3 and provided at its other end with a roller 12 guided in a slideway 13 secured to chassis 14 of a truck.

Thus, upon actuation of the jack 4, the arm 11 is pivoted and bears against the chassis 14 of the truck via the roller 12. In the course of pivoting movement, which results in displacing the roller 12 relative to the chassis 14 of the truck, said roller 12 is guided in the slideway 13, whereby pivoting of said truck bed can be effected in a continuous and smooth manner.

According to another characteristic of the invention, the arm 11 is preferably constituted by two independent members each integral with one end of the axle 3 of the actuator, each member being provided with a roller 12 coacting with slideway 13 secured to one side of the chassis 14 of the truck bed. Thanks to such an arrangement, it is possible to ensure simultaneously good transverse rigidity of the truck bed at the level of the connection of its chassis 14 to the actuator.

According to another characteristic of the invention, the axle 13 for supporting pinions or pulleys or grooved wheels 6 could also be integral with these latter and be connected at its ends to plates 16 secured to chassis 14 of the truck bed to form the pivoting axis of this latter. Thanks to this arrangement, the actuation of the pivoting the truck bed is effected simultaneously at the level of its pivotal axis and adjacent the opposite end of this axis, such that the power needed can be substantially reduced.

FIG. 5 shows another embodiment of the pivotal actuator of a truck bed, in which the linkage actuator is integrated in the arm 17 for swinging a truck bed, whose chassis 14 bears via slideways 13 coacting with rollers 12 on the end of said arm 17 opposite the linkage axle 3 of this latter on the chassis 10 of the truck or trailer, said arm 17 being preferably in the form of a double arm or of a casing housing the linkage actuator.

Figure 6:
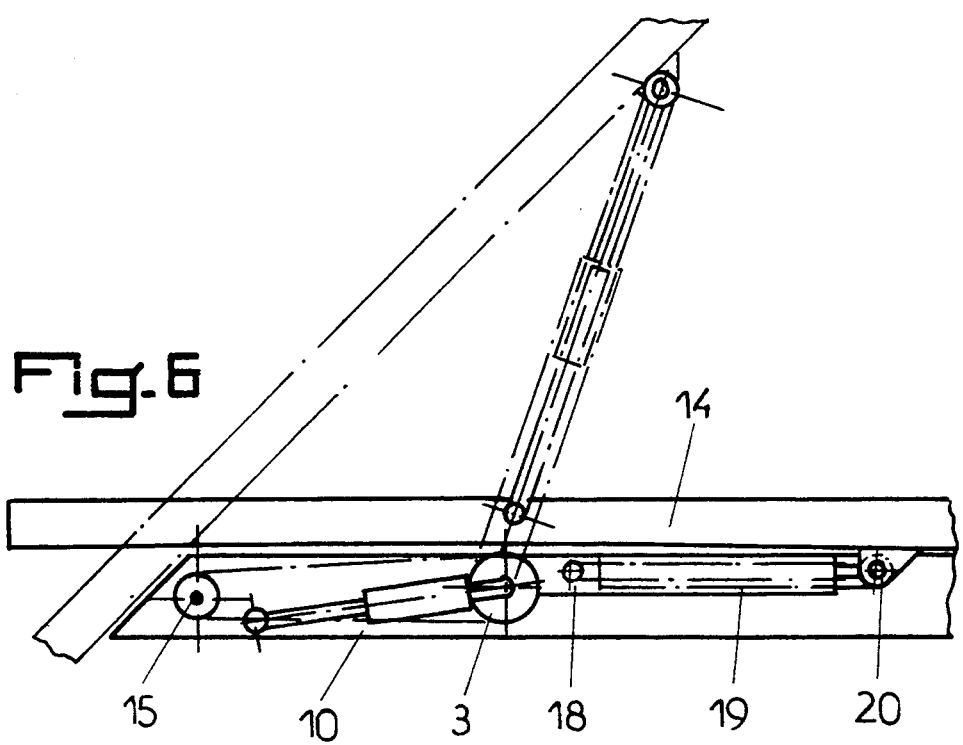

FIG. 6 shows another embodiment of the invention, in which the linkage actuator is integrated with a chassis 10 of a truck or trailer and is connected by its axle 3 to an arm 18 housing at least a telescopic jack 19, whose piston rod or cylinder is connected to at least one bearing 20 of the chassis 14 of the truck bed on the side opposite the linkage axle 15 of this latter on the chassis 10.

Such an embodiment permits on the one hand replacing rollers 12 and slideways 13 and on the other hand developing simultaneously with the swinging force, a pushing force promoting pivoting of the truck bed. In such a case, the size of the jacks 4 and 19 or their feed arrangement is so calculated that the jack 4 acts with priority, the force of the jack or jacks 19 not developing until after a predetermined time lag. A differential control of the jacks can particularly be provided, in known manner, by means of a timer.

FIG. 7 shows another embodiment of the invention, in which the linkage actuator is integrated in one of the arms of a jackknife 21 for controlling swinging of a truck bed, its linkage axle 3 being integral with the chassis 10 of a truck or of a trailer and its axle 15 for supporting the pinions, pulleys or grooved wheels 6 forming the swinging axle of the second arm of said jackknife, this free end coacts with a bearing 22 on the chassis 14 of the truck bed. Such jackknife 21 acts in a manner completely identical to a known classical jackknife.

FIGS. 8 and 9 of the accompanying drawings show the use of the actuator according to the invention for stabilizing outriggers of vehicles or handling machinery, particularly during the operations of loading or unloading.

As shown in FIG. 8, the actuator can be integrated in an outrigger 23 with the possibility of pivoting about its axle 3 on the end of a telescopic transverse member 24 of a vehicle. Thus, during actuation of the jack 1, the outrigger pivots into the position shown in broken line in FIG. 8, so as to apply its shoe 25 to the ground and to stabilize the vehicle. A supplemental stabilization can be obtained by complementary actuation of the jack 4 which has the effect of pivoting the outrigger 23 into a vertical position, this pivoting being accompanied by telescopic extension of the transverse member 24, as shown in phantom line in FIG. 8.

FIG. 9 shows a modification of FIG. 8, in which the outrigger 23 is mounted on the chassis 26 of a vehicle, by parallelogram linkage comprising at least one pair of parallel arms 27 articulated on one hand on chassis 26 and, on the other hand, one directly on the chains or cables 5 and the other on the outrigger 3.

Thus, moving from the position shown in FIG. 9, during actuation of the jack 4, the outrigger 23 first rises, with its shoe 25, from the ground, then pivots in the direction of chassis 26 of the vehicle, into its non-illustrated folded position.

Thanks to the invention, it is possible to provide a linkage actuator for effecting .all rectilinear or rotative movements, usable in particular for movements of folding and unfolding the arms of cranes, load handling masts, arms of scoops, cableway masts or the like, as well as a stabilizer of an engine or as a hydraulic outrigger of an engine or for the handling of casings or other containers mounted on trucks or on trailers, or for any mechanism requiring rotative or rectilinear movement.

Of course, the invention is not limited to the embodiments described and shown in the accompanying drawings. Modifications remain possible, particularly as to the construction of the various elements or by substitution of technical equivalents, without thereby departing from the scope of protection of the invention.

What is claimed is:

1. A linkage actuator adapted to effect swinging movement of one element about another element, comprising: an axle on which one element is mounted for swinging movement relative to an other element, a wheel on said other element spaced from said axle, an endless member trained about said axle and said wheel and adapted to drive said axle in rotation upon circulating movement of said endless member about said axle and said wheel thereby to swing said axle and hence said one element relative to said other element, said endless member extending between said axle and said wheel in two parallel runs, and jack means including a first end and a second end, at least one of which is secured to one of said runs, and the other end of said jack means being secured to the other of said runs for acting between said endless member and said axle to rotate said axle selectively in opposite directions upon expansion or contraction of said jack means.

2. A linkage actuator as claimed in claim 1, said jack means and said endless member and said wheel being housed within said other element.

3. A linkage actuator adapted to effect swinging movement of one element about another element, comprising: an axle on which one element is mounted for swinging movement relative to an other element, a wheel on said other element spaced from said axle, an endless member trained about said axle and said wheel and adapted to drive said axle in rotation upon circulating movement of said endless member about said axle and said wheel thereby to swing said axle and hence said one element relative to said other element, and jack means including a first end and a second end, at least one of which is fixed relative to said endless member by means of a carriage, and rollers between said carriage and said other element for acting between said endless member and said axle to rotate said axle selectively in opposite directions upon expansion or contraction of said jack means.

4. A linkage actuator as claimed in claim 3, said jack means and said endless member and said wheel being housed within said other element.

* * * * *